United States Patent
Kerres

(10) Patent No.: US 8,168,705 B2
(45) Date of Patent: May 1, 2012

(54) POLYMER MEMBRANES

(76) Inventor: Jochen Kerres, Ostfildern (DE)

( * ) Notice: Subject to any disclaimer, the term of this patent is extended or adjusted under 35 U.S.C. 154(b) by 0 days.

(21) Appl. No.: 12/850,530

(22) Filed: Aug. 4, 2010

(65) Prior Publication Data

US 2011/0027691 A1    Feb. 3, 2011

Related U.S. Application Data

(60) Division of application No. 12/102,776, filed on Apr. 14, 2008, now abandoned, which is a continuation of application No. 10/275,114, filed on Dec. 12, 2002, now Pat. No. 7,358,288.

(30) Foreign Application Priority Data

May 2, 2000   (DE) ................................. 100 21 106
Apr. 27, 2001   (WO) ....................... PCT/DE01/01624

(51) Int. Cl.
  *C08K 5/41*  (2006.01)
(52) U.S. Cl. ........ 524/167; 524/394; 524/398; 524/399; 524/233; 524/235; 524/104
(58) Field of Classification Search ................ 524/167, 524/394, 398, 399, 233, 235, 104
See application file for complete search history.

(56) References Cited

U.S. PATENT DOCUMENTS 6,465,136 B1 * 10/2002 Fenton et al. ................. 429/309
2004/0251450 A1    12/2004 Kerres et al.

OTHER PUBLICATIONS

P.Staiti et aL: "Preparation and proton conductivity of composite membranes of Nafion 1100 and titanium sulfopbeniylphosphonate" New Materials for Electrochemical Systems III, Extended Abstracts of the Third International Symposium on New Materials for Electrochemical Systems Jul. 1999.*

* cited by examiner

*Primary Examiner* — Peter D Mulcahy
(74) *Attorney, Agent, or Firm* — Edward C. Kwok; Haynes and Boone LLP

(57) ABSTRACT

The invention relates to novel organic/inorganic hybrid membranes which have the following composition: a polymer acid containing —$SO_3H$, $PO_3H_2$, —COOH or $B(OH)_2$ groups, a polymeric ease (optional), which contains primary, secondary or tertiary amino groups, pyridine groups, imidazole, benzimidazole, triazole, benzotriazole, pyrazole or benzopyrazole groups, either in the side chain or in the main chain; an additional polymeric base (optional) containing the aforementioned basic groups; an element or metal oxide or hydroxide, which has been obtained by hydrolysis and/or sol-gel reaction of an elementalorganic and/or metalorganic compound during the membrane forming process and/or by a re-treatment of the membrane in aqueous acidic, alkaline or neutral electrolytes. The invention also relates to methods for producing said membranes and to various uses for membranes of this type.

19 Claims, 3 Drawing Sheets

POLYMER MEMBRANES

CROSS REFERENCE TO RELATED APPLICATIONS

The present application is a divisional of U.S. patent application Ser. No. 12/102,776 filed on Apr. 14, 2008 now abandoned, which is a continuation of U.S. patent application Ser. No. 10/275,114 filed on Dec. 12, 2002 now U.S Pat. No. 7,358,288, both of which are incorporated herein by reference.

The invention relates to novel organic/inorganic hybrid membranes which have the following composition:
- a polymeric acid containing —$SO_3H$, —$PO_3H_2$, —COOH or $B(OH)_2$ groups
- a polymeric base (optional), which contains primary, secondary or tertiary amino groups, pyridine groups, imidazole, benzimidazole, triazole, benzotriazole, pyrazole or benzopyrazole groups either in the side chain or in the main chain.
- an additional polymeric base (optional) containing the aforementioned basic groups
- an element or metal oxide or hydroxide, which has been obtained by hydrolysis and/or sol-gel reaction of an elementorganic and/or metalorganic compound during the membrane forming process and/or by posttreatment of the membrane in aqueous acidic, alkaline or neutral electrolytes.

The invention also relates to methods for producing said membranes and to various uses for membranes of this type.

The state-of-the-art regarding ionomer/inorganic hybrid composites is exposed in the review of Mauritz, who is one of the pioneers of the implementation of sol/gel technique in organopolymers, and especially in ionomers such as Nafion® (Organic-inorganic hybrid materials: perfluorinated ionomers as sol-gel polymerization templates for inorganic alkoxides K. A. Mauritz Mat. Sci. Eng. C 6 (1998) 121-133). Core of the process is the hydrolysis of an elementorganic or metalorganic compound in the matrix of an ionically functionalized organopolymer to an element or metal oxide or hydroxide network.

Further examples of systems described in the literature are:
(a) Nafion® is preswollen in water and alcohol and then immersed in tetraethoxysilane (TEOS)/alcohol solutions. In the sulfonic acid clusters of the Nafion membrane then a sol-gel reaction takes place catalyzed by the sulfonic acid protons, from TEOS to $SiO_2$/OH networks containing water ("nanocomposites") (Microstructural evolution of a Silicon Oxide Phase in a Perfluorosulfonic Acid ionoimer by an In Situ Sol-Gel Reaction, K. A. Mauritz, I. D. Stefaniithis, S. V. Davis, et al. J. Appl. Polym. Sci. 55, 181-190 (1995)).
(b) Nafion® is preswollen in water and alcohol and then immersed in alcohol solutions of $Zr(OBu)_4$. In the sulfonic acid clusters of the Nafion membrane then a sol-gel reaction takes place catalyzed by the sulfonic acid protons, from $Zr(OBu)_4$ to $ZrO_2$ networks containing water ("nanocomposites") (Asymmetric Nation/(Zirconium Oxide) Hybrid Membranes via In Situ Sol-Gel Chemistry, W. Apichatachutapan, R. B. Moore, K. A. Matuitz, J. Appl. Polym. Sci. 62, 417-426 (1996)).
(c) Nafion sulfonyl fluoride precursor membranes are preswollen in perfluorohydrophenanthrene and immersed in 3-aminopropyltriethoxysilane. Thereafter excess silane is washed out with EtOH. Hybrids are formed, in which, by hydrolysis of said silane and by reaction of said silane with $SO_2F$-groups, $SiO_2$-networks partially cross-linked with the polymer are formed in the membrane matrix (Chemical modification of a nation sulfonyl fluoride precursor via in situ sol-gel reactions, A. J. Greso, R. B. Moore, K. M. Cable, W. L. Jarrett, K. A. Mauritz, Polymer 38, 1345-1356 (1997).
(d) Surlyn® ionomer membranes in the $Zn^{2+}$ form are swollen in 1-propanol and then immersed in $H_2O$/TEOS mixtures. In the membrane matrix then a sol-gel reaction takes place catalyzed by the sulfonic acid protons, front TEOS to $SiO_2$/OH networks containing water ("nanocomposites") (Surlyn®/[Silicon Oxide] Hybrid Materials. 2. Physical Properties Characterization, D. A. Siuzdak, K. A. Mauritz, J. Polym. Sci. Part B: Polymer Physics, 37, 143-154 (1999).

A disadvantage of the known systems (a) to (d) is, that the sol-gel reaction takes place in a preformed membrane and consequently the content of an inorganic polymer phase formed by hydrolysis, of the polymer composite can not be set at will.

Also hybrid systems of nonionic polymers and metal or element oxides are described in the literature:
(e) composites of poly(n-butylmrethacrylate) and titanium oxide, made by water vapor hydrolysis of titanium alkoxides, which had been added to alcoholic solutions of a poly(n-butylmethacrylate) polymer solution, in the polymer matrix after evaporation of the solvent. (Novel Poly (n-Butyl Methacrylate)/Titanium Oxide Alloys Produced by the Sol-Gel process for Titanium Alkoxides, K. A. Mauritz, C. K Jones, J. Appl. Polym. Sci. 40, 1401-1420 (1990)).
(f) composite membranes of polyetherimide and nanodispersed silicium oxide, made by hydrolysis of TEOS in solutions of polyetherimide Ultem® in NMP by adding of 0.15 M HCl solution. After hydrolysis dense or phase inversed membranes are made from this polymer solution. Compatibility of the inorganic with the organic phase was obtained by extra addition of 3-aminopropyltrimethoxysilane (AS) (Membranes of poly(ether imide) and nanodispersed silica, S. P. Nunes, K. V. Peinemann, K, Ohlrogge, A. Alpers, M. Keller, A. T. N. Pires, J. Memb. Sci. 157 (1999) 219-226)).

These systems present similar disadvantages as already described previously.

As the descriptions show, there are already a number of pure organic and also provided with inorganic additives proton conducting membranes, however all of these systems and membranes present poor thermal and mechanical stability, which especially impinges on regions above a temperature of 100° C.

Consequently an object of the invention is to provide novel composites and composite membranes of mixtures of cation exchange polymers and basic polymers additionally containing an inorganic element/metal oxide/hydroxide phase, which improves the following membrane properties:
- mechanical stability
- thermal stability
- improved water holding ability even at temperatures of >100° C., which is important in particular for the application in membrane fuel cells in the temperature range>100° C.

This object is solved by providing membranes according to claim 1.

Furthermore the process according to the invention contributes to solve this object.

Herein organic precursors of element/metal oxides/hydroxides are brought into the polymer solution (alkoxide/ester, acetylacetonate etc). The formation of the inorganic phase in the ionomer happens after the membrane formation by hydrolysis in acidic, alkaline and/or neutral aqueous environment.

Surprisingly it has been found, that if Ti diacetylacetonate diisopropylate/isopropanol is brought into solutions of the salt form of sulfonated poly(etheretherketone) sPEEK and a basic polymer (e.g. polybenzimidazole PBI Celazol®) in NWP or DMAc, the Ti diacetylacetonate diisopropylate does not hydrolyze in the polymer solution, but is built into the membrane matrix on evaporating of the solvent. Surprisingly it has been found, that the organic Ti compound can be hydrolyzed by successive posttreatment of the membrane in aqueous lye and/or water and/or acid via sol/gel reaction to titanium oxide nanodispersed in the membrane matrix. The titanium oxide can be identified by EDX in the membrane matrix. Thereby contents of $TiO_2$ in the membrane matrix of up to 35 weight % can be reached.

The composites according to the invention consist of:
- a polymeric acid with $-SO_3H$, $-PO_3H_2$, $-COOH$ or $B(OH)_2$ groups, preferentially with an aryl main chain polymer backbone
- (optionally) one or two polymeric bases which carry primary, secondary or tertiary amino groups, pyridine groups, imidazole, benzimidazole, triazole, benzotriazole, pyrazole or benzopyrazole groups either in the side chain and/or in the main chain.
- an element or metal oxide or hydroxide, obtained by hydrolysis of the following classes of elementorganic and/or metalorganic compounds:
    - metal/element alkoxide/ester of Ti, Zr, Sn, Si, B, Al
    - a metal acetylacetonates, e.g. $Ti(acac)_4$, $Zr(acac)_4$
    - mixed compounds of metal/element alkoxides and metal acerylacetonates, e.g. $Ti(acac)_2(OiPr)_2$ etc.
    - organic amino compounds of Ti, Zr, Sn, Si, B, Al and are producible during the membrane formation process and/or by posttreatment of the membrane in aqueous acidic, alkaline or neutral electrolytes.

Due to the nanodispersed inorganic phase brought into the membrane matrix according to the invention the profile of properties of the ionomer(blend)membranes according to the invention is strongly improved.

The new inorganic/organic hybrid acid base blend membranes according to the invention show an excellent profile of properties:
- good proton conductivity
- excellent thermal stability
- excellent mechanical stability
- limited swelling.

Especially the water holding abilities of the membrane especially at T>100° C. are strongly improved. This is achieved by the inorganic oxide/hydroxide, which is present in the membrane in nanodispersed distribution of the inorganic component. By mixing of oxide powders into ionomer membranes, as has already been proposed in some publications (Comparison of Ethanol and Methanol Oxidation in a Liquid-Feed Solid Polymer Electrolyte Fuel Cell at High Temperature A. S. Arico, P. Creti, P. L. Antonucci, V. Antonucci, Electrochem. Sol. St. Lett. 182) 66-68 (1998)), such a fine distribution of the inorganic component in the membrane matrix as with the method according to the invention, wherein the elementorganic/metalorganic compounds are hydrolyzed to the oxide only in the membrane matrix, can not be reached.

Thereby the membranes according to the invention show still further advantages:
- reduced methanol permeability
- contribution to proton conductivity, especially at T>100° C.

The invention shall be exemplified by some examples as follows.

Preparation of Ionomer Blend Membrane TJ-3

2 g of sulfonated polyether ether ketone Victrex® (ion exchange capacity 1,364 meq $SO_3H/g$) are dissolved in 10 g N-Methylpyrrolidinone. Subsequently 1 g of triethylamine is added to the solution to neutralize the sulfonic acid groups of the sPEEK. Hereafter 77 mg of poly(4-vinylpyridine) are added to the solution. After dissolution 5.1 g titanium(IV) bis(acetylacetonato) diisopropylate, 75 weight % solution in isopropanol, are added to the solution. Then the polymer solution film is degassed and then cast onto a glass-plate by a doctor knife to a 800 µm thick film. In a membrane dryer the solvent is removed at 100° C. After film drying the glass-plate with the polymer film is immersed in a tub with $H_2O$. The film peels off from the glass-plate. The film is posttreated for 24 h at 70° C. in 1N NaOH, and then 24 h at 70° C. in deionized water. Hereafter the film is stored at room temperature in deionized water. For the determination of the proton conductivity the film is equilibrated for 24 h in 0.5 N $H_2SO_4$ at room temperature.

| Characterization results: | |
|---|---|
| Film thickness [µm]: | 100 |
| IEC [meq $SO_3H/g$]: | 1.15 |
| Swelling [%]: | 104 |
| Permselectivity (0.5N/0.1N NaCl) [%]: | 78.35 |
| $R_{sp}^{H+}$ (0.5N HCl) [Ωcm]: | 6.4 |
| $R_{sp}^{H+}$ ($H_2O$) [Ωcm]: | 16.9 |
| $R_{sp}^{Na+}$ (0.5N NaCl) [Ωcm]: | 29.6 |

Figure 1:
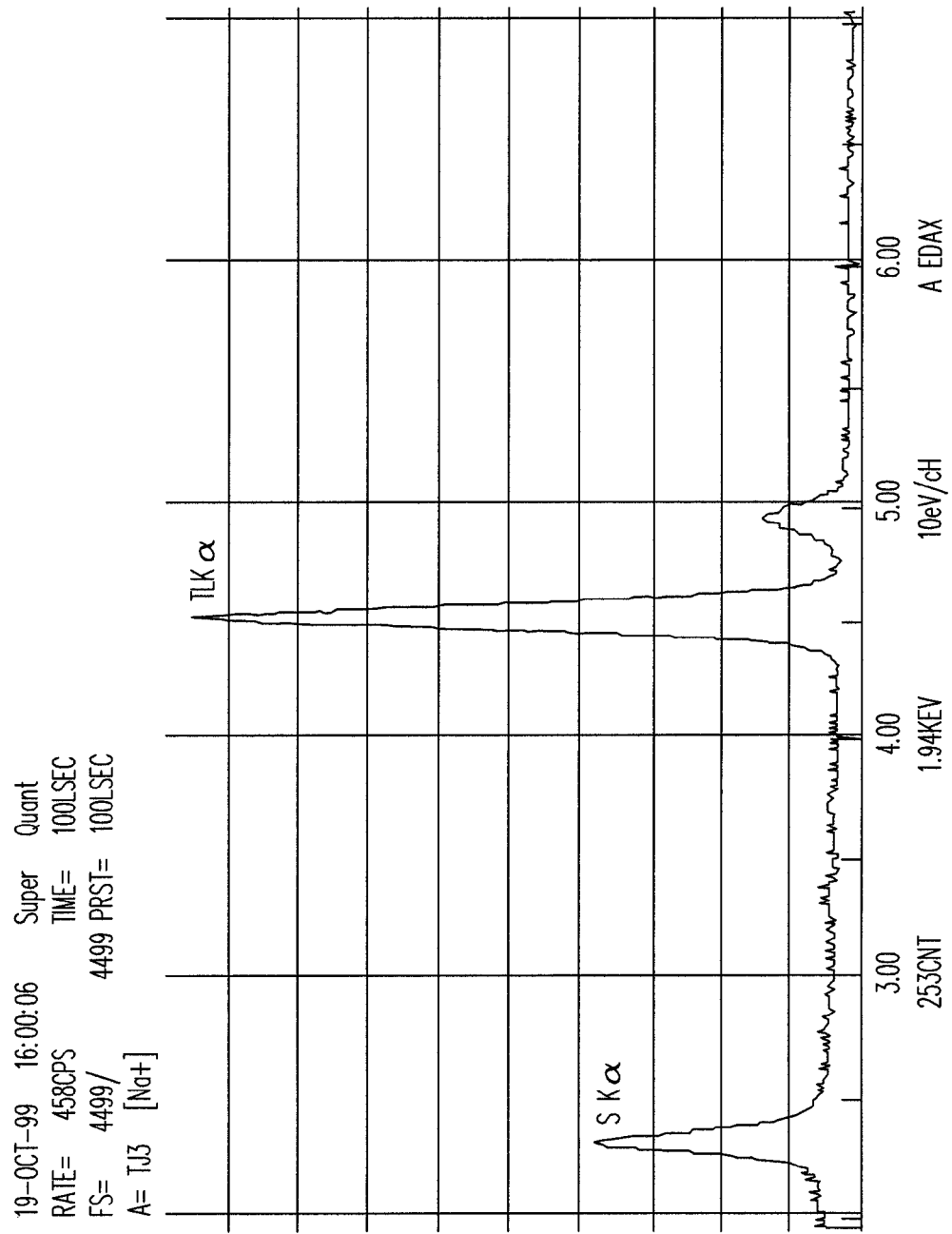
FIG. 1 shows an energy dispersion x-ray (EDX) spectrum of ionomer blend membrane TJ-3, according to one embodiment of the present invention.
Figure 2:
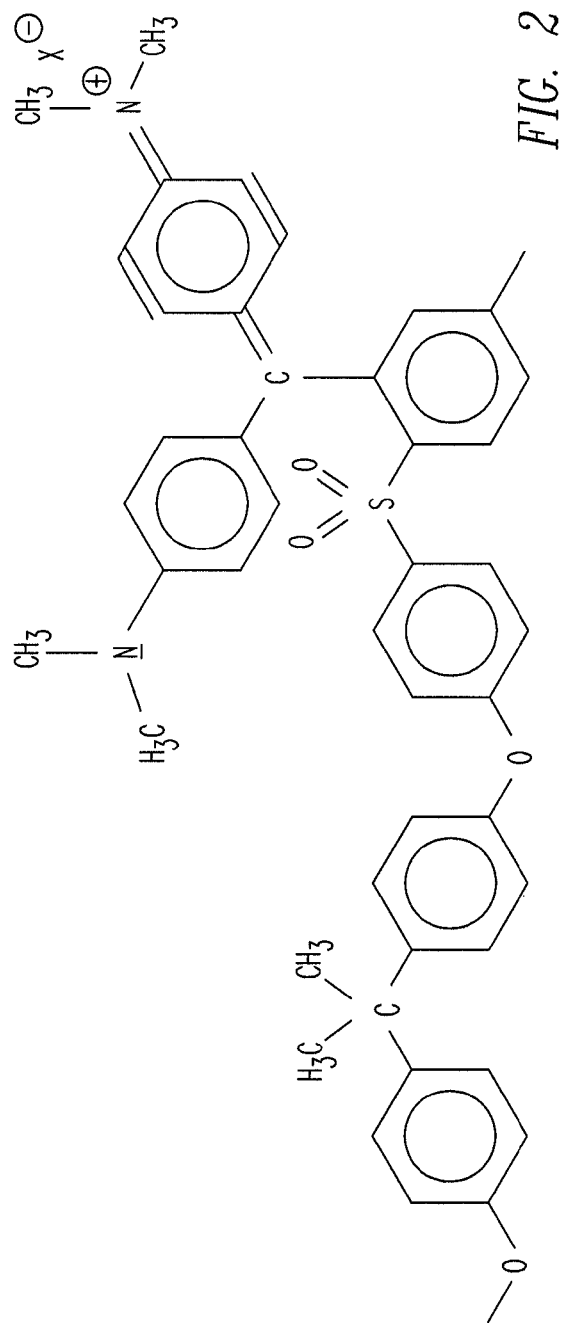
FIG. 2 shows the molecular structure of a monomer of "polymer 1", used in the preparation of ionomer blend membrane JOA-2, in accordance with one embodiment of the present invention.

In FIG. 1 the EDX spectrum of the TJ3 membrane is shown. The Ti signal is clearly visible.

Preparation of Ionomer Blend Membrane JOA-2

Figure 3:
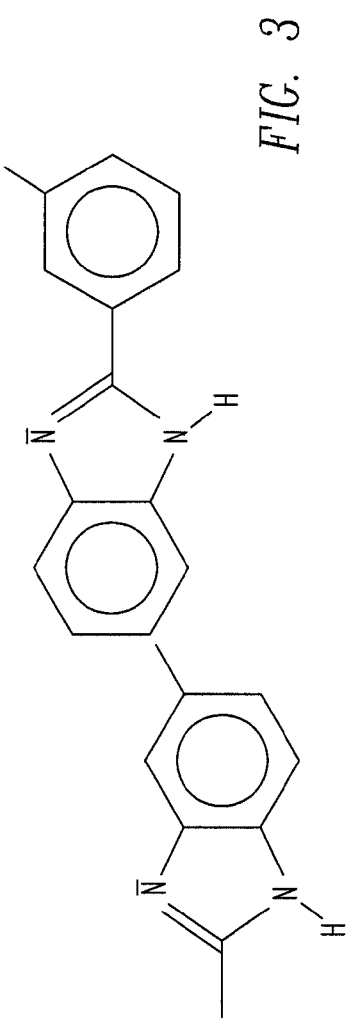
FIG. 3 shows the molecular structure of PBI Celazol®, used in the preparation of ionmer blend membrane JOA-2, in accordance with one embodiment of the present invention.

3 g of sulfonated poly(etheretherketone) Victrex® (ion exchange capacity 1.75 meq $SO_3H/g$) are dissolved in 15 g N-Methylpyrrolidinone. Hereafter 0.5 g of n-propylamine are added to the solution to neutralize the sulfonic acid groups of the sPEEK. Hereafter 0.15 g of polymer 1 (FIG. 3) and added to the solution. Hereafter 1.4 g of 10.72 weight % PBI Celazol® (FIG. 3) solution are added to the solution. Hereafter 4.036 g titanium(IV) bis(acetylacetonato) diisopropylate, 75 weight % solution in isopropanol, are added to the solution.

Hereafter the polymer solution film is degassed and then cast onto a glass-plate with a doctor knife to a 800 μm thick film. In a vacuum drying oven the solvents are removed first for 1 h at 75° C. and 800 mbar and then at 120° C. and at a pressure of first 800 mbar and then down to 50 mbar. After film drying the glass-plate with the polymer film is immersed in a tub with $H_2O$. The film peels off from the glass-plate. The film is posttreated for 24 h at 70° C. in 1N NaOH, and then for 24 h at 70° C. in deionized water. Thereafter the film is stored at room temperature in deionized water. For the determination of the proton conductivity the film is equilibrated for 24 h in 0.5 N $H_2SO_4$ at room temperature.

| Characterization results: | |
|---|---|
| Film thickness [μm]: | 100 |
| IEC [meq $SO_3H$/g]: | 0.97 |
| Swelling [%]: | 27.7 |
| Permselectivity [%]: | 94.9 |
| $R_{sp}^{H+}$ (0.5N $H_2SO_4$) [Ωcm]: | 21.8 |
| $R_{sp}^{H+}$ ($H_2O$) [Ωcm]: | 55.6 |
| $R_{sp}^{Na+}$ (0.5N NaCl) [Ωcm]: | 79 |

Figure 4:
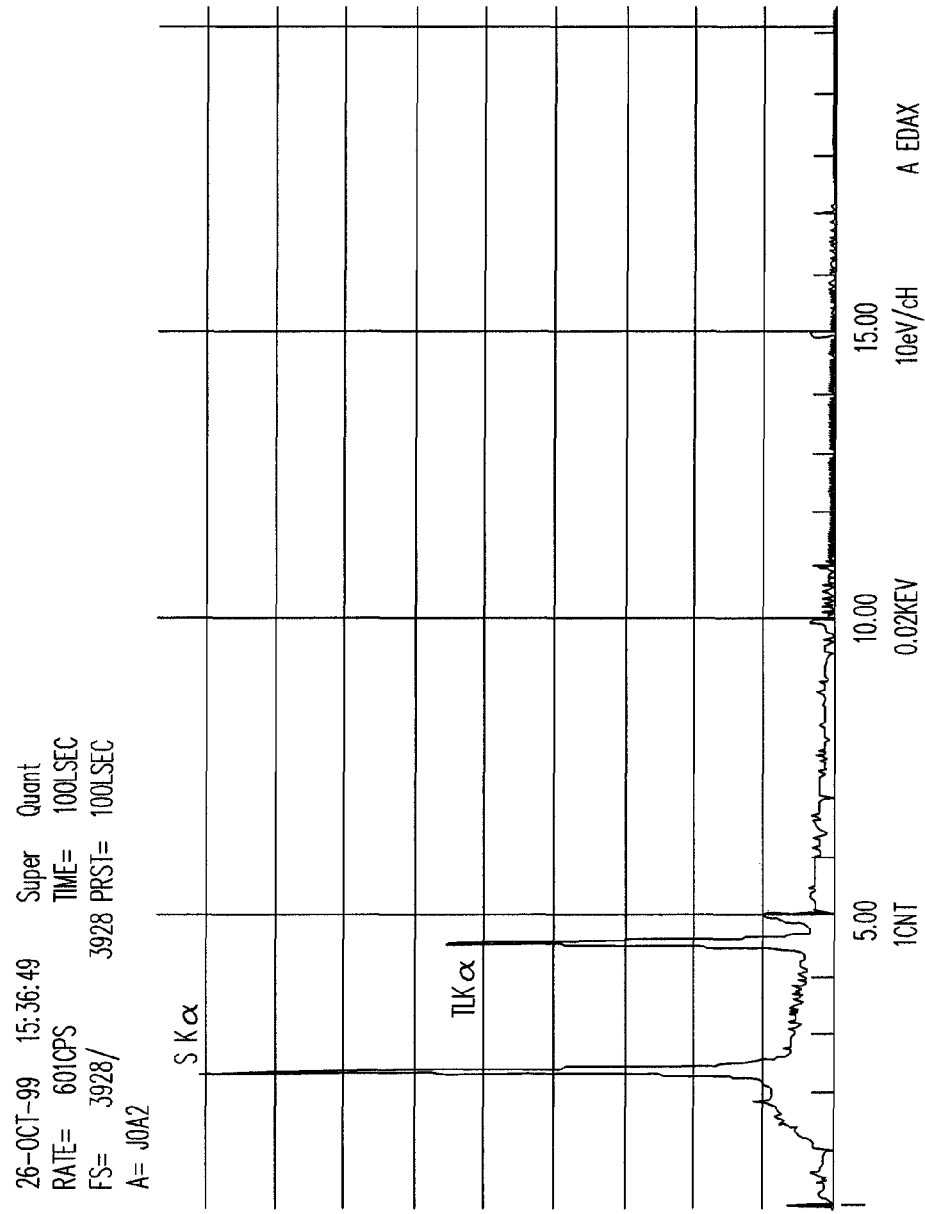
FIG. 4 shows an EDX spectrum of ionomer blend membrane JOA-2 membrane, according to one embodiment of the present invention.

In FIG. 4 the EDX spectrum of the JOA-2 membrane is shown—The Ti signal is clearly visible.

The invention claimed is:

1. A process for preparing a composite or composite membrane comprising:
   Mixing, in a dipolar-aprotic solvent:
   (a) a polymeric acid selected from the group consisting of $SO_3X$, $PO_3X_2$, COOX and $B(OX)_2$, where $X=H^+$, protonated Triethylamine $(C_2H_5)_3NH^+$, protonated n-propylamine $(C_3H_7)NH^+$, univalent or bivalent or trivalent or tetravalent metal cation;
   (b) a polymeric base selected from a group consisting of primary, secondary or tertiary amino groups, pyridine groups, imidazole, benzimidazole, triazole, benzo-triazole, pyrazole and benzopyrazole groups, either in a side chain or a main chain; and
   (c) a metal organic or element organic compound selected from the group consisting of (i) metal element alkoxides and esters of Ti, Zr, Sn, Si, B, or Al, (ii) metal acetylacetonates, (iii) mixed compounds of metal and element alkoxides, (iv) metal acetylacetonates, and (v) organic amino compounds of Ti, Zr, Sn, Si, B, and Al.

2. A process as in claim 1 wherein said dipolar aprotic solvent is selected from the group consisting of N-methylpyrrolidone (NMP), N,N-dimethylacetamide (DMAc), N,N-dimethylformamide (DMF), dimethylsulfoxide (DMSO) and sulfolane.

3. A process as in claim 1, wherein said polymeric acid comprises an aryl main chain polymer or copolymer selected from the group consisting of polyethersulfones, polysulfones, polyphenyl sulfones, polyether ether sulfones, polyether ketones, polyether ether ketones, polyphenylene ethers, polydiphenylphenylene ethers, and polyphenylene sulfides.

4. A process as in claim 1, wherein the polymer solution is cast as a thin film onto a support, the solvent is evaporated at a temperature of from 50° C. to 150° C. at normal pressure or under a vacuum condition.

5. A process as in claim 4, wherein the thin film is cured using one or more of the following conditions:
   (1) in water, at a temperature of 50° C. to 100° C.;
   (2) in 1 to 100% mineral acid, at a temperature of 50° C. to 100° C.; and
   (3) in 1 to 50% aqueous base, in an anhydrous liquid amine, or in a mixture of liquid amines.

6. A process as in claim 4, wherein said support is selected from the group consisting of a glass plate, metal plate, tissue, woven material, non-woven material, fleece, porous membrane and a polymer membrane.

7. A polymer solution formed using the process of claim 1.

8. A polymer solution formed using the process of claim 2.

9. A polymer solution formed using the process of claim 3.

10. A composite or composite membrane formed using the process of claim 4.

11. A composite or composite membrane formed using the process of claim 5.

12. A composite or composite membrane as in claim 11, provided in an electrochemical energy producing means.

13. A composite or composite membrane according to claim 11, provided in a component in a membrane $H_2$— or direct methanol fuel cell at a temperature of from 0° C. to 180° C.

14. A composite or composite membrane according to claim 11, provided in a component of an electrochemical cell.

15. A composite or composite membrane as in claim 11, provided in a component in a secondary battery.

16. A composite or composite membrane as in claim 11, provided in a component in an electrolysis cell.

17. A composite or composite membrane as in claim 11, provided in a component in a membrane separation process.

18. A composite or composite membrane as in claim 17, wherein said separation process is selected from the group consisting of gas separation, pervaporation, perstraction, reverse osmosis, electrodialysis and diffusion dialysis.

19. A composite or composite membrane formed using the process of claim 6.

* * * * *